United States Patent
Ouchi

(10) Patent No.: US 8,495,216 B2
(45) Date of Patent: Jul. 23, 2013

(54) COMMUNICATION CONTROL SYSTEM, COMMUNICATION CONTROL METHOD AND COMPUTER-READABLE STORAGE MEDIUM

(75) Inventor: Masatomo Ouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 678 days.

(21) Appl. No.: 12/685,844

(22) Filed: Jan. 12, 2010

(65) Prior Publication Data

US 2010/0180036 A1    Jul. 15, 2010

(30) Foreign Application Priority Data

Jan. 15, 2009 (JP) ................... 2009-006895

(51) Int. Cl.
G06F 15/173 (2006.01)
(52) U.S. Cl.
USPC ............................ 709/226; 709/223; 709/224
(58) Field of Classification Search
USPC ......................................... 709/226, 223–224
See application file for complete search history.

(56) References Cited

U.S. PATENT DOCUMENTS

| | | | | |
|---|---|---|---|---|
| 6,108,306 | A * | 8/2000 | Kalkunte et al. ............... | 370/235 |
| 6,820,117 | B1 * | 11/2004 | Johnson ........................ | 709/223 |
| 6,999,421 | B1 * | 2/2006 | Holzworth et al. ........... | 370/235 |
| 7,453,804 | B1 * | 11/2008 | Feroz et al. .................... | 370/230 |
| 7,577,162 | B2 * | 8/2009 | Liaw et al. ..................... | 370/468 |
| 7,620,325 | B2 * | 11/2009 | Mizutani et al. .............. | 398/100 |
| 7,653,080 | B2 * | 1/2010 | Takemoto et al. ............ | 370/442 |
| 8,081,661 | B2 * | 12/2011 | Yoo et al. ...................... | 370/468 |
| 8,149,771 | B2 * | 4/2012 | Khivesara et al. ............ | 370/329 |
| 2004/0103193 | A1 * | 5/2004 | Pandya et al. ................. | 709/224 |
| 2005/0227698 | A1 | 10/2005 | Nonin et al. ................ | 455/452.2 |
| 2006/0126507 | A1 * | 6/2006 | Nakayasu ...................... | 370/229 |
| 2006/0159040 | A1 * | 7/2006 | Takemoto et al. ............ | 370/321 |
| 2007/0054645 | A1 * | 3/2007 | Pan ................................ | 455/266 |
| 2007/0064731 | A1 * | 3/2007 | Mizutani et al. .............. | 370/468 |
| 2007/0064732 | A1 * | 3/2007 | Liaw et al. ..................... | 370/468 |
| 2007/0180119 | A1 * | 8/2007 | Khivesara et al. ............ | 709/226 |
| 2007/0217339 | A1 | 9/2007 | Zhao ............................. | 370/252 |
| 2008/0205442 | A1 * | 8/2008 | El Kolli et al. ................ | 370/468 |
| 2009/0157443 | A1 * | 6/2009 | Gracieux ......................... | 705/7 |
| 2009/0318235 | A1 * | 12/2009 | Ashida et al. .................... | 463/42 |
| 2010/0005174 | A1 * | 1/2010 | Naughton et al. ............ | 709/226 |
| 2010/0128684 | A1 * | 5/2010 | Tanigawa et al. ............ | 370/329 |
| 2010/0161802 | A1 * | 6/2010 | Tofighbakhsh et al. ....... | 709/226 |
| 2011/0106952 | A1 * | 5/2011 | Doppler et al. ............... | 709/226 |

FOREIGN PATENT DOCUMENTS

| | | | |
|---|---|---|---|
| JP | 2005-277862 A | 10/2005 | |
| JP | 2006-174039 A | 6/2006 | |
| JP | 2007-074234 A | 3/2007 | |
| JP | 2007-251940 A | 9/2007 | |

* cited by examiner

Primary Examiner — Waseem Ashraf
(74) Attorney, Agent, or Firm — Fitzpatrick, Cella, Harper & Scinto

(57) ABSTRACT

A communication control system constituted by a communication terminal, a management apparatus that manages the communication terminal, and a wireless communication network in which the communication terminal and the management apparatus are communicable with each other.

7 Claims, 9 Drawing Sheets

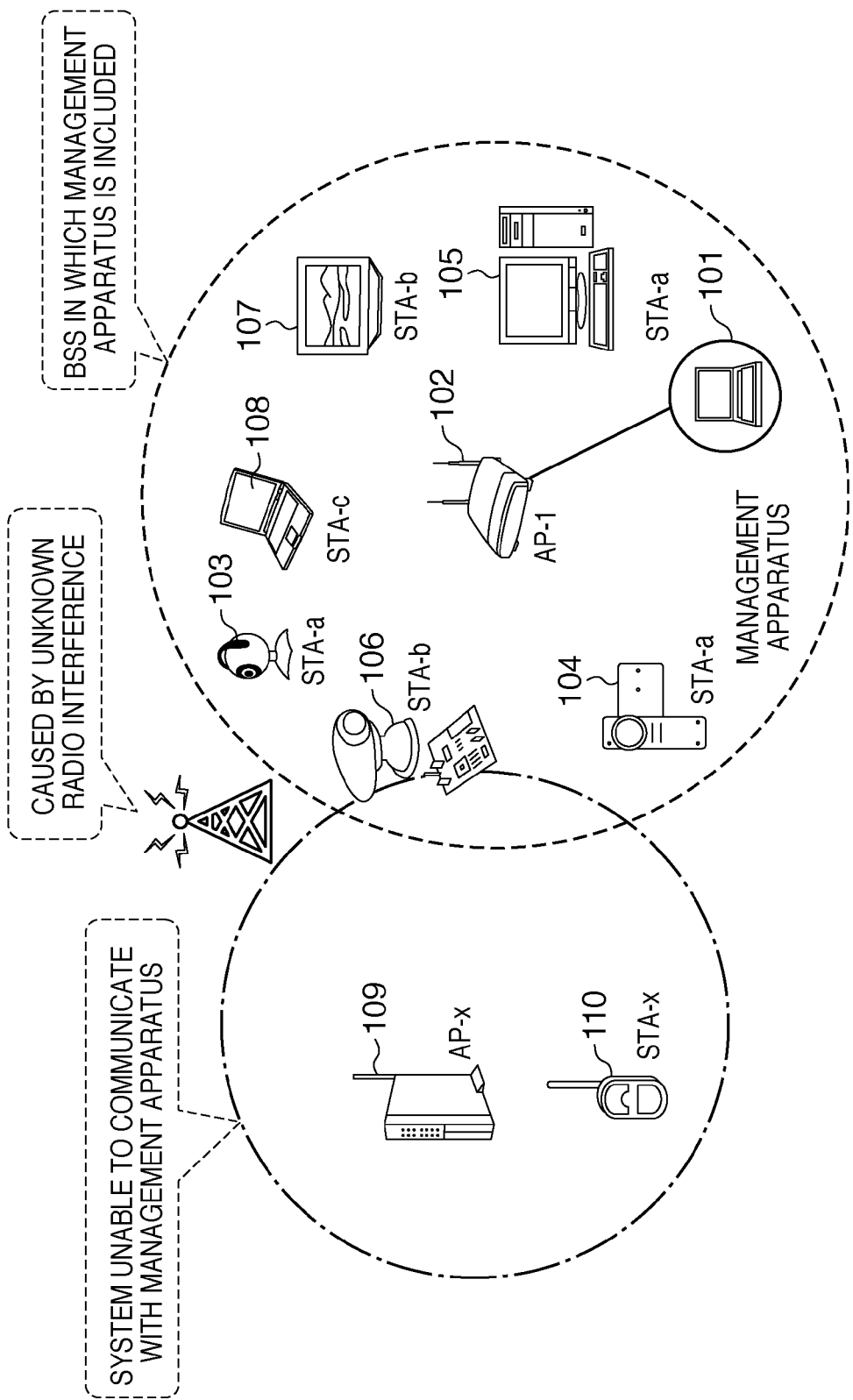

F I G. 2

◆ OTHER DEVICES

| MANAGEMENT APPARATUS | |
|---|---|
| ACCESS POINT AP-1 | STANDARD COMMUNICATION (E.G., IP COMMUNICATION) WITH MANAGEMENT APPARATUS AVAILABLE |
| ACCESS POINT AP-x | COMMUNICATION WITH MANAGEMENT APPARATUS UNAVAILABLE |

◆ COMMUNICATION TERMINALS

| | CONTROLLABILITY BY MANAGEMENT APPARATUS | GENERATED DATA AMOUNT OF APPLICATION |
|---|---|---|
| STA-a (BANDWIDTH REQUESTING TERMINAL) | ○ | CONSTANT |
| STA-b (BANDWIDTH NON-REQUESTING TERMINAL) | ○ | VARIABLE |
| STA-c | × | UNKNOWN |
| STA-x | × | UNKNOWN |

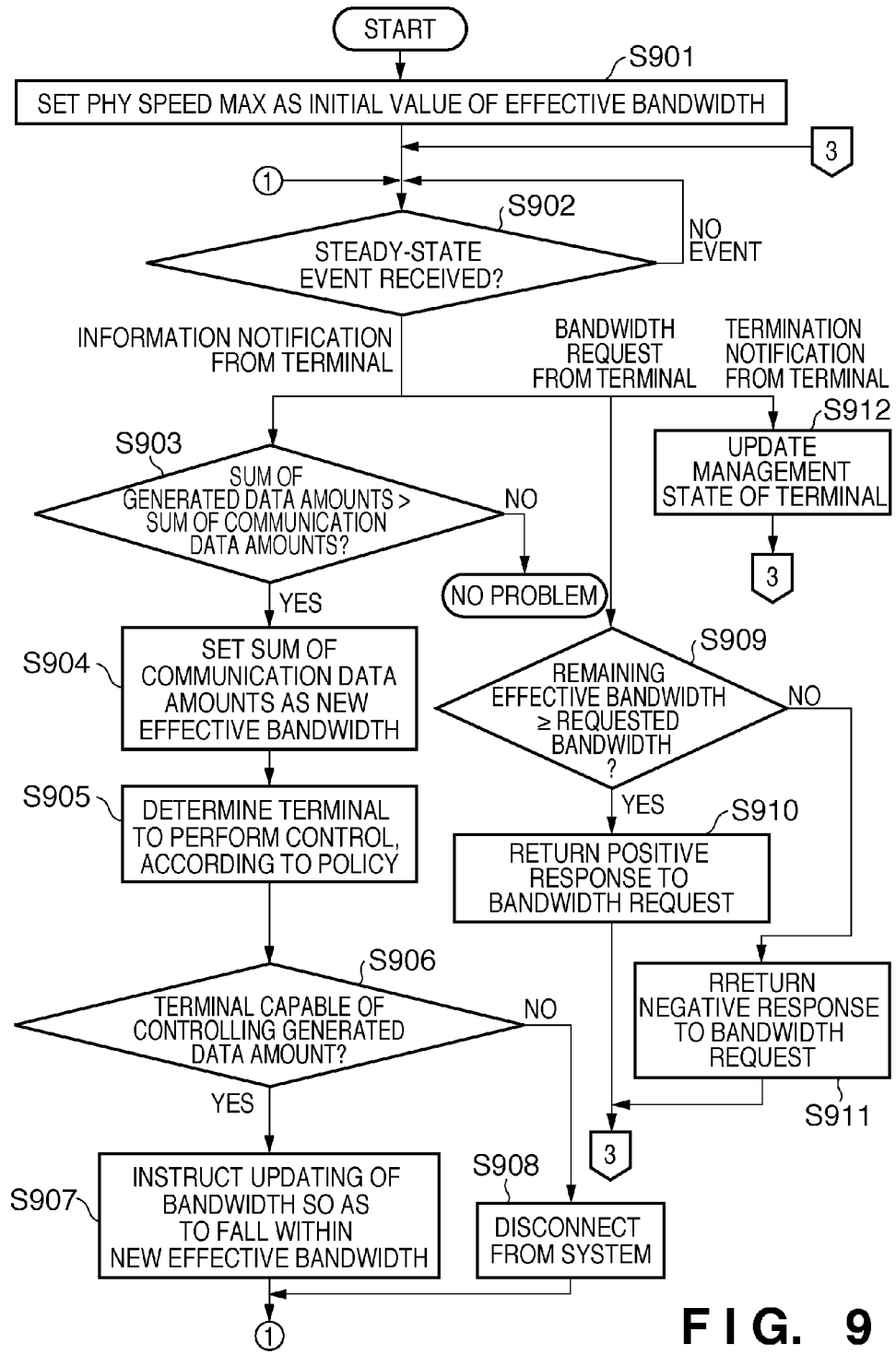
F I G. 9

FIG. 11

| | POLICY CONTENT |
|---|---|
| 1 | ORDER OF SIZE OF CURRENT USED BANDWIDTHS |
| 2 | ORDER OF SIZE OF CURRENT GENERATED DATA AMOUNTS |
| 3 | ORDER OF CURRENT COMMUNICATION START TIMES |
| 4 | HISTORIES OF BEING TARGETED FOR BANDWIDTH REDUCTION OR SYSTEM DISASSOCIATION |
| 5 | AVERAGE VALUES OF BANDWIDTHS USED BY TERMINALS SINCE STARTUP |
| 6 | TOTAL DATA AMOUNTS GENERATED BY TERMINALS SINCE STARTUP |

COMMUNICATION CONTROL SYSTEM, COMMUNICATION CONTROL METHOD AND COMPUTER-READABLE STORAGE MEDIUM

BACKGROUND OF THE INVENTION

1. Field of the Invention

The present invention relates to a communication control system, a communication control method and a computer-readable storage medium for storing a program for ensuring communication quality.

2. Description of the Related Art

Conventionally, control techniques in the case where communication bandwidth required by communication terminals varies include the following.

In a first technique, the sequence of video frames (e.g., I frames, P frames and B frames in an MPEG video sequence) is monitored at a higher layer than the MAC layer. The size of video frames and the pattern of video frames per unit of time are determined, and a future data rate at a future time is predicted based on the size of video frames and the pattern of video frames per unit of time. Parameters (e.g., AIFS, CW, CWmax, CWmin) of the MAC layer are then adjusted based on the predicted future data rate at the future time (e.g., see Japanese Patent Laid-Open No. 2007-251940).

In a second technique, a QoS management unit is provided in a base station in a wireless communication system in which a plurality of terminals 1 to n communicates information with a common base station via a wireless transmission channel. If a change in transmission speed is detected by a link adaptation controller, the QoS management unit is notified. Scheduling and rescheduling of bandwidth allocation to the terminals 1 to n by the QoS management unit are triggered by a change in transmission speed due to link adaptation (e.g., see Japanese Patent Laid-Open No. 2005-277862).

However, the first technique is an operation for individual terminals, and does not touch on control in the case of a plurality of terminals.

Also, the second technique only deals with a change in the state of a link, and does not take into account the data amount required by applications.

Also, investigations were conducted into whether a wired communication technique can be applied to this problem. In the case of wired communication, the influence of other terminals can be physically blocked by a switching HUB or the like. Also, in the case of sharing media, conflicts can nearly always be detected. In other words, a change in the state of communication media differs in nature from the case of wireless. Therefore, a conventional wired communication technique cannot be directly applied to retaining quality and ensuring bandwidth with wireless.

SUMMARY OF THE INVENTION

The present invention provides a communication control technique capable of ensuring communication quality, even in the case where the communication bandwidth required by communication terminals or the status of communication media varies.

According to one aspect of the present invention, there is provided a communication control system comprising: at least one communication terminal; a management apparatus that manages the communication terminal; and a wireless communication network in which the communication terminal and the management apparatus are communicable with each other, wherein the communication terminal includes: a notifying unit adapted to notify, to the management apparatus, a generated data amount indicating a data amount that an application requests to be transmitted and a communication data amount indicating a data amount transmitted to the wireless communication network, and the management apparatus includes: a calculating unit adapted to calculate an effective bandwidth indicating a maximum value of the communication data amount usable in wireless communication by all communication terminals in the communication control system, based on the generated data amount and the communication data amount notified from the communication terminal; and a restricting unit adapted to restrict wireless communication by the communication terminal, based on the effective bandwidth calculated by the calculating unit.

According to another aspect of the present invention, there is provided a communication control method of a communication control system constituted by at least one communication terminal, a management apparatus that manages the communication terminal, and a wireless communication network in which the communication terminal and the management apparatus are communicable with each other, steps executed by the communication terminal comprising: notifying, to the management apparatus, a generated data amount indicating a data amount that an application requests to be transmitted and a communication data amount indicating a data amount transmitted to the wireless communication network, and steps executed by the management apparatus comprising: calculating an effective bandwidth indicating a maximum value of the communication data amount usable in wireless communication by all communication terminals in the communication control system, based on the generated data amount and the communication data amount notified from the communication terminal; and restricting wireless communication by the communication terminal, based on the effective bandwidth calculated in the calculating step.

The present invention enables communication quality to be ensured, even in the case where the communication bandwidth required by communication terminals or the status of communication media varies.

Further features of the present invention will become apparent from the following description of exemplary embodiments (with reference to the attached drawings).

BRIEF DESCRIPTION OF THE DRAWINGS

FIG. 1 is a diagram showing a schematic configuration of a communication system according to an embodiment of the present invention.

FIG. 2 is a diagram in which the definitions of constituent elements in the system have been compiled and organized.

FIG. 9 is a flowchart illustrating the flow of processing by a management apparatus 101 that includes control characteristic of the present invention.

FIG. 11 is a diagram illustrating specific examples of policy values.

DESCRIPTION OF THE EMBODIMENTS

Figure 3:
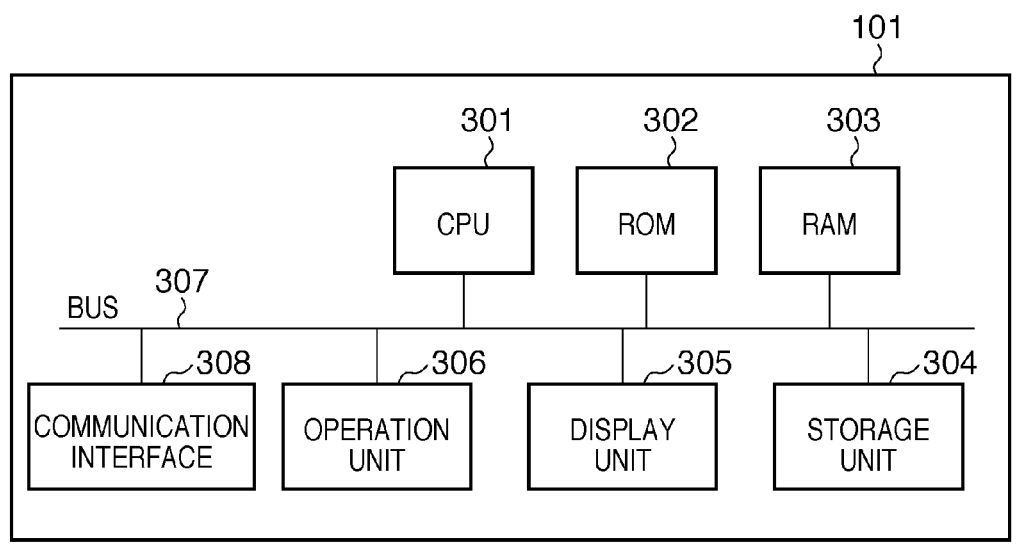
FIG. 3 is a block diagram illustrating a configuration of a management apparatus.

FIG. 1 is a diagram showing a schematic configuration of a communication control system (hereinafter, also simply referred to as "the system") constituted by communication terminals, a management apparatus that manages the communication terminals, and a wireless communication network in which the communication terminals and the management apparatus are communicable with each other, according to the present embodiment.

Reference numeral 101 denotes a management apparatus that integrally manages the communication terminals and the communication control system, and reference numeral 102 denotes an access point AP-1 connected to the management apparatus, in the communication control system according to embodiments of the present invention. The management apparatus and the access point are capable of standard communication such as SNMP (Simple Network Management Protocol) communication which is standard in the IETF (Internet Engineering Task Force).

Reference numerals 103, 104 and 105 denote communication terminals (bandwidth requesting terminals) that perform stream communication after performing a bandwidth requesting process with respect to the management apparatus, and will be referred to as "STA-a" type terminals. In the case where stream communication is performed using an application that requests transmission of a constant data amount per unit of time (e.g., stored stream communication, which will be detailed later), the communication terminal operates as a bandwidth requesting terminal. Reference numerals 106 and 107 denote communication terminals (bandwidth non-requesting terminals) that start stream communication without performing a bandwidth requesting process, and will be referred to as "STA-b" type terminals. In the case where stream communication is performed using an application that request transmission of a variable data amount per unit of time (e.g., live stream communication, which will be detailed later), the communication terminal operates as a bandwidth non-requesting terminal. Here, to simplify the description, the bandwidth requesting terminals and the bandwidth non-requesting terminals are assumed to be separate communication terminals, but a single communication terminal may operate as both a bandwidth requesting terminal and a bandwidth non-requesting terminal according to the data that is communicated. Reference numeral 108 denotes a communication terminal that cannot be controlled from the management apparatus, and will be referred to as a "STA-c" type terminal. Reference numeral 109 denotes an access point of a different system from the access point AP-1, and will be referred to as an "AP-x" type access point. Also, reference numeral 110 denotes a terminal associated with the access point AP-x, and will be referred to as "STA-x". Hereinafter, the communication terminals will also be simply referred to as "the terminals".

FIG. 2 is a diagram in which definitions of the constituent elements in the system have been compiled and organized.

Next, a block diagram of the constituent elements will be described. FIG. 3 is a block diagram of the management apparatus 101. A CPU (Central Processing Unit) 301 controls the management apparatus 101. A ROM (Read Only Memory) 302 is a semiconductor memory for storing programs and parameters not requiring modification. A RAM (Random Access Memory) 303 is a memory for temporarily storing programs and data supplied from an external apparatus or the like. A storage unit 304 stores application programs that are executed by the management apparatus 101. This storage unit 304 is constituted by a hard disk (HDD) fixedly installed in the management apparatus 101 or a memory card, for example. Alternatively, the storage unit 304 may include a flexible disk (FD), an optical disk such as a compact disk (CD) or a DVD, a magnetic card, an optical card, an IC card, a memory card or the like removable from the management apparatus 101.

A display unit 305 is constituted by a liquid crystal display, for example, and displays data held by or supplied to an apparatus equipped with the management apparatus 101. An operation unit 306 is constituted by a pointing device, a keyboard, or the like. An internal bus 307 electrically connects the elements from 301 to 306. Reference numeral 308 denotes a communication interface composed of an Ethernet controller or the like.

Figure 4:
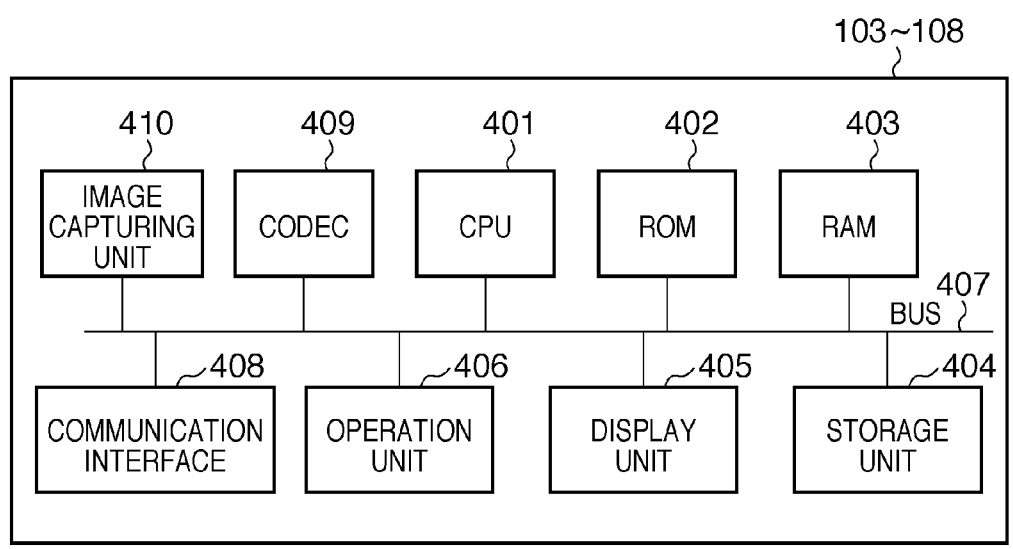
FIG. 4 is a block diagram illustrating a configuration of a terminal.

FIG. 4 is a common block diagram of terminals 103 to 108. Reference numerals 401 to 408 denote equivalent blocks to 301 to 308 of the management apparatus 101, and description thereof will be omitted. Reference numeral 409 denotes a CODEC that encodes and decodes video and audio. Reference numeral 410 denotes an image capturing unit such as a camera. Note that, depending on the terminal, only a camera function or only a display function may be provided, in which case the terminal will not include all of the blocks shown in FIG. 4.

Next, the terms will be defined.

The "generated data amount" is the data amount that an application requests to be transmitted per unit of time.

The "communication data amount" is the data amount that a communication device was able to transmit on a communication medium per unit of time. This can be derived from the amount of time spent transmitting data and the physical speed of transmission at that time. The communication terminal may notify the time spent transmitting data and the physical speed of transmission at that time to the management apparatus, or notify a value obtained by multiplying these two data.

Note that the "generated data amount" is the actual application data, and is a numerical value that does not include the headers of the transport layer, network layer and link layer, or the preamble of the physical layer. On the other hand, the "communication data amount" is the amount transmitted on a communication medium. The CPU 401 in the terminal is able to obtain this value from the communication interface 408. In the case of comparing the "generated data amount" and the "communication data amount", the CPU 401 performs the comparison after converting the header parts and the like.

The "effective bandwidth" is a bandwidth that the management apparatus recognizes as being usable by all communication terminals in the system. Note that the bandwidth that the communication terminals in the system are actually able to use may be reduced due to the effect of interference from other systems, for instance. Consequently, the effective bandwidth managed by the management apparatus and the bandwidth actually usable by the communication terminals in the system do not always match. As will be discussed later, the management apparatus manages, as the effective bandwidth, the sum of the "communication data amounts" of the STA-a and STA-b terminals when at least one of the STA-a and STA-b terminals is in state where the "communication data amount" is less than the "generated data amount".

"Communication state information" is a generic term for the "generated data amount" and the "communication data amount". The communication terminals generate communication state information composed of the generated data amount indicating the data amount that an application requests to be transmitted and the communication data amount indicating the data amount transmitted to the wireless communication network.

FIG. 9 is a flowchart illustrating the flow of processing by the management apparatus 101 that includes control characteristic of the present invention. In the following description, the agent of the control in the flowchart is the management apparatus 101, unless otherwise indicated. More specifically, this flowchart represents processing by the CPU 301 based on inputs from the operation unit 306 and programs in the ROM 302 or the storage unit 304.

Firstly, in step S901, the management apparatus 101 begins by performing initialization. In relation to the present invention, in particular, the effective bandwidth of wireless media for the entire system is obtained and held as an initial value in the RAM 303 or the storage unit 304. The effective bandwidth at this time is the maximum value of the physical speed of the access point 102. Deriving this maximum value of the physical speed itself involves using conventional technology, and only the names of methods will be given here. For example, these include SNMP (Simple Network Management Protocol), and LLDP (Link Layer Discovery Protocol) defined by IEEE 802.1AB. Also, there are methods that, while not the standards of standard organizations, are defined independently by corporations, such as Microsoft's LLTD (Link Layer Topology Discovery).

When the initialization process ends, the management apparatus 101 waits at step S902 for an event. Here, an event includes notification of communication state information or a bandwidth request from a terminal, or a termination notification from a terminal.

Receipt of Information Notification from Terminal

In the case of receiving notification of communication state information from a terminal, the management apparatus 101 advances the processing to step S903, and compares the "sum of generated data amounts" and the "sum of communication data amounts".

When, in the comparison of step S903, the "sum of communication data amounts" is smaller than the "sum of generated data amounts", the management apparatus 101 advances the processing to step S904. In step S904, the management apparatus 101 sets the "sum of communication data amounts" as the new effective bandwidth. The management apparatus 101 analyzes the generated data amount and the communication data amount included in the communication state information, and calculates (estimates) an effective bandwidth indicating the maximum value of the communication data amount usable in wireless communication by all communication terminals. In other words, the management apparatus 101 performs management based on a value dynamically calculated according to the state, rather than the static value determined at step S901.

Here, the states of the STA-a and STA-b terminals will be described. A state in which the "sum of communication data amounts" is smaller than the "sum of generated data amounts" indicates that communication data generated by the terminals is congested in the terminals. If this data is stream application data, problems such as delays and data loss will arise on the playback side.

In view of this, the management apparatus 101 restricts wireless communication by the communication terminals, based on the calculated effective bandwidth. In other words, in step S905, the management apparatus 101 performs control to resolve problems that occur in the communication terminals. Control involves restricting the operations of communication terminals, including wireless communication. Here, in the present invention, a policy value is set that decides the order in which to restrict the communication terminals. Specific examples of policy values will be described later with reference to FIG. 11. The management apparatus 101 selects (determines) a communication terminal for restricting (controlling) operations including wireless communication, in accordance with a policy value.

In step S906, the management apparatus 101 then determines whether the terminal determined based on that policy is able to control the generated data amount. To perform this determination, the management apparatus 101 obtains, from the communication terminal, attribute information indicating whether the communication terminal is a communication terminal that is able to control the generated data amount or a communication terminal that is unable to control the generated data amount. Note that a terminal that is able to control the generated data amount is a terminal that operates as a bandwidth requesting terminal, and a terminal that is unable to control the generated data amount is a terminal that operates as a bandwidth non-requesting terminal.

If the communication terminal is able to control the generated data amount, the management apparatus 101 advances the processing to step S907. If the calculated value of the new effective bandwidth decreases compared with the previously set effective bandwidth, the management apparatus 101, in step S907, instructs the selected communication terminal to reduce the bandwidth (update the bandwidth) so as to fall within the new effective bandwidth.

On the other hand, if, in the determination of step S906, the management apparatus 101 determines that the terminal is unable to control the generated data amount, the processing is advanced to step S908. In step S908, the management apparatus 101 instructs the terminal that is unable to control the generated data amount to disassociate from the system (disconnect from the system).

Here, specific examples of policy values will be described with reference to FIG. 11.

With a policy 1, the order in which terminals are targeted for restriction is decided by the size of current used bandwidths, that is, by the bandwidths that terminals were using at that point in time.

With a policy 2, the order in which terminals are targeted for restriction is decided by the size of current generated data amounts, that is, by the values, or the "generated data amounts", that were requested to be transmitted by the applications of terminals at that point in time.

With a policy 3, the order in which terminals are targeted for restriction is decided by the start times of communication by terminals at that point in time.

With a policy 4, the order in which terminals are targeted for restriction is decided by the histories of being targeted for bandwidth reduction (bandwidth updating) or system disassociation in the past.

With a policy 5, the order in which terminals are targeted for restriction is decided by the average values of bandwidths used by terminals since startup.

With a policy 6, the order in which terminals are targeted for restriction is decided by the total data amounts generated by terminals since startup.

Note that which of these policies to employ is determined by a user using the operation unit 306 when the management apparatus 101 performs initialization, or by values held in the ROM 302.

Here, description will return to the flowchart of FIG. 9. After the processing of step S907 or step S908, the processing returns to step S902, and the management apparatus 101 executes similar processing.

Receipt of Bandwidth Request from Terminal

When a bandwidth request from a terminal is received in step S902, the management apparatus 101 advances the processing to step S909. In step S909, the management apparatus 101 compares the requested bandwidth and the remaining amount of effective bandwidth. When the remaining amount of effective bandwidth is equal to or greater than the requested bandwidth, the management apparatus 101, in step S910, returns a positive response to the terminal.

On the other hand, if, in the determination of step S909, the management apparatus 101 determines that the remaining amount of effective bandwidth is smaller than the requested bandwidth, the management apparatus 101, in step S911, returns a negative response to the terminal.

After the processing of step S910 or step S911, the management apparatus 101 returns the processing to step S902, and stands by in a state of waiting for receipt of an event.

Receipt of Termination Notification from Terminal

When a stream termination notification from a terminal is received in step S902, the management apparatus 101 advances to step S912, and updates the management state of the terminal. After the processing of step S912, the management apparatus 101 returns the processing to step S902, and stands by in a state of waiting for receipt of an event.

Figure 10:
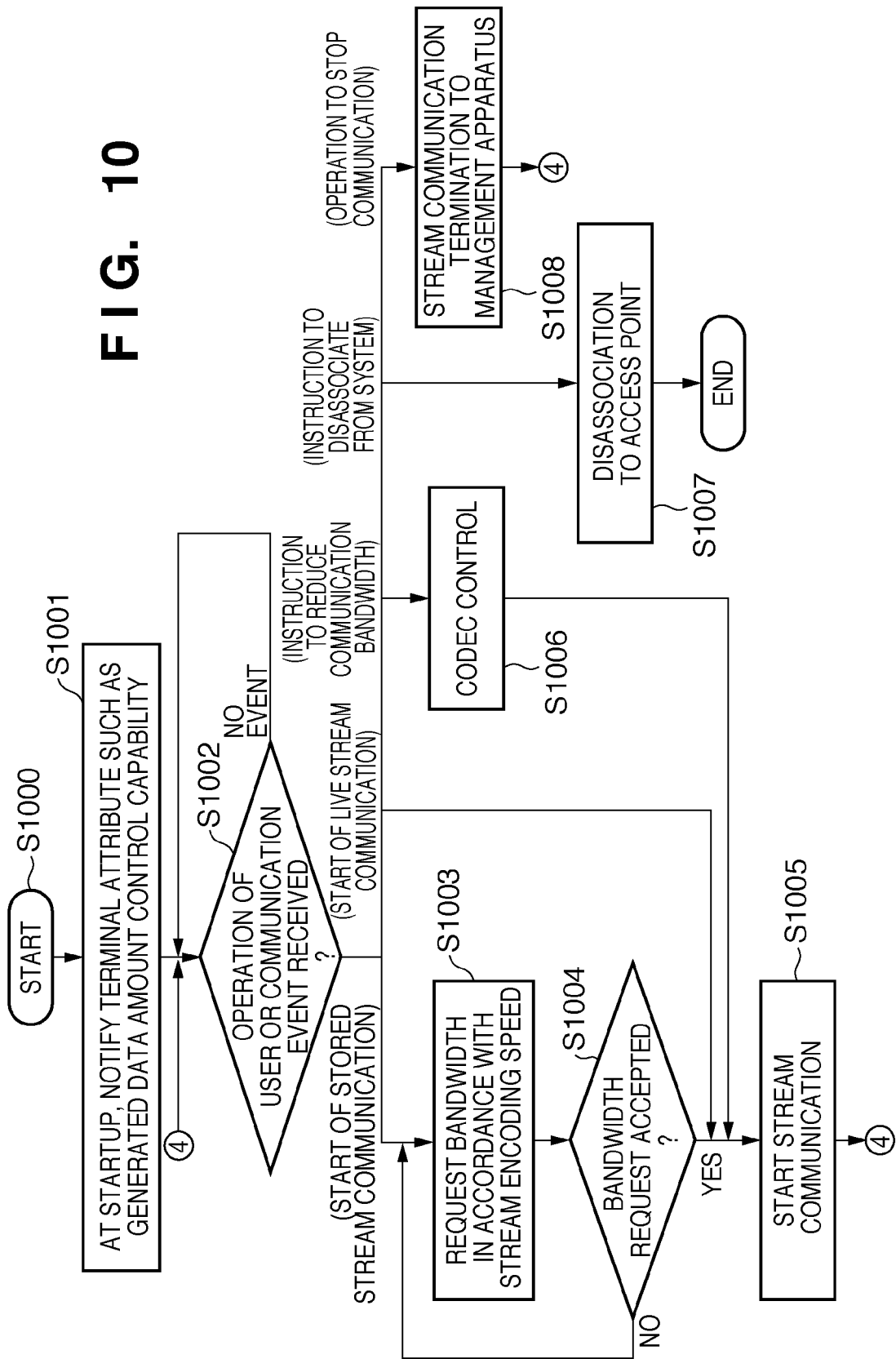
FIG. 10 is a flowchart illustrating the flow of processing by STA-a and STA-b terminals.

FIG. 10 is a flowchart illustrating the flow of processing by the STA-a and STA-b terminals.

Firstly, in step S1001, the STA-a and STA-b terminals perform an initialization process. This involves notifying a terminal attribute to the management apparatus 101. A terminal attribute includes a capability for controlling the generated data amount of a stream that is decided by the CODEC or the like. The management apparatus 101 judges from this capability whether bandwidth reduction can be instructed.

Next, in step S1002, the STA-a and STA-b terminals enter a state of waiting for an operation of a user or an instruction from the management apparatus 101 (communication event). Hereinafter, control of a terminal in response to events that could occur in this state will be described.

Start of Stored Stream Communication

Firstly, the case where there is a request for transmission of stored stream communication from a user or another communication device will be described. In this case, the processing is advanced to step S1003.

In this case, because the stream encoding speed is known in advance, the terminal requests the management apparatus 101 for necessary communication bandwidth at step S1003, based on this value. In other words, the terminal operates as a bandwidth requesting terminal in the case of performing stored stream communication.

At step S1004, the terminal then waits for a response from the management apparatus 101, and determines the content of the response. If a negative response (step S1004: NO), the terminal responds by changing the encoding speed, for instance, before returning to step S1003, and again requesting the management apparatus 101 for bandwidth. If the bandwidth request is accepted (step S1004: YES), the terminal advances to step S1005, and starts stream communication. The terminal then returns to the state of step S1002.

Start of Live Stream Communication

Next, the case where a request is made at step S1002 to start live stream communication, which is different from stored stream communication, will be described. The difference with stored stream communication is that it may not be possible to determine the encoding amount in advance. At this time, the terminal advances immediately to step S1005 and starts communication, without request the management apparatus 101 for bandwidth. In other words, the terminal operates as a bandwidth non-requesting terminal in the case of performing live stream communication. Then, the processing is subsequently returned to step S1002.

Reduction of Communication Bandwidth

Next, the case where a terminal is instructed to reduce the communication bandwidth in step S1002 will be described. At this time, the terminal, in step S1006, controls the CODEC 409 to change the stream encoding speed, so as to coincide with the instructed bandwidth, and resumes stream communication at step S1005. Then, the processing is subsequently returned to step S1002.

Disassociation from System

Next, the case where a terminal is instructed to disassociate from the system in step S1002 will be described. At this time, the terminal stops stream communication, and transmits a disassociation to the access point 102 (S1007), before disassociating from the system. The system then reverts to the state of step S1000.

Communication Stop Operation

Next, the case where the user has performed a communication stop operation in step S1002 will be described. At this time, the terminal, at step S1008, notifies a stream communication termination to the management apparatus 101. The terminal then returns the processing to step S1002.

Note that in this description, a flowchart corresponding to the case where a single terminal operates as an STA-a terminal and as an STA-b terminal is shown, but the terminals may be configured to operate fixedly as either type of terminal.

Figure 5:
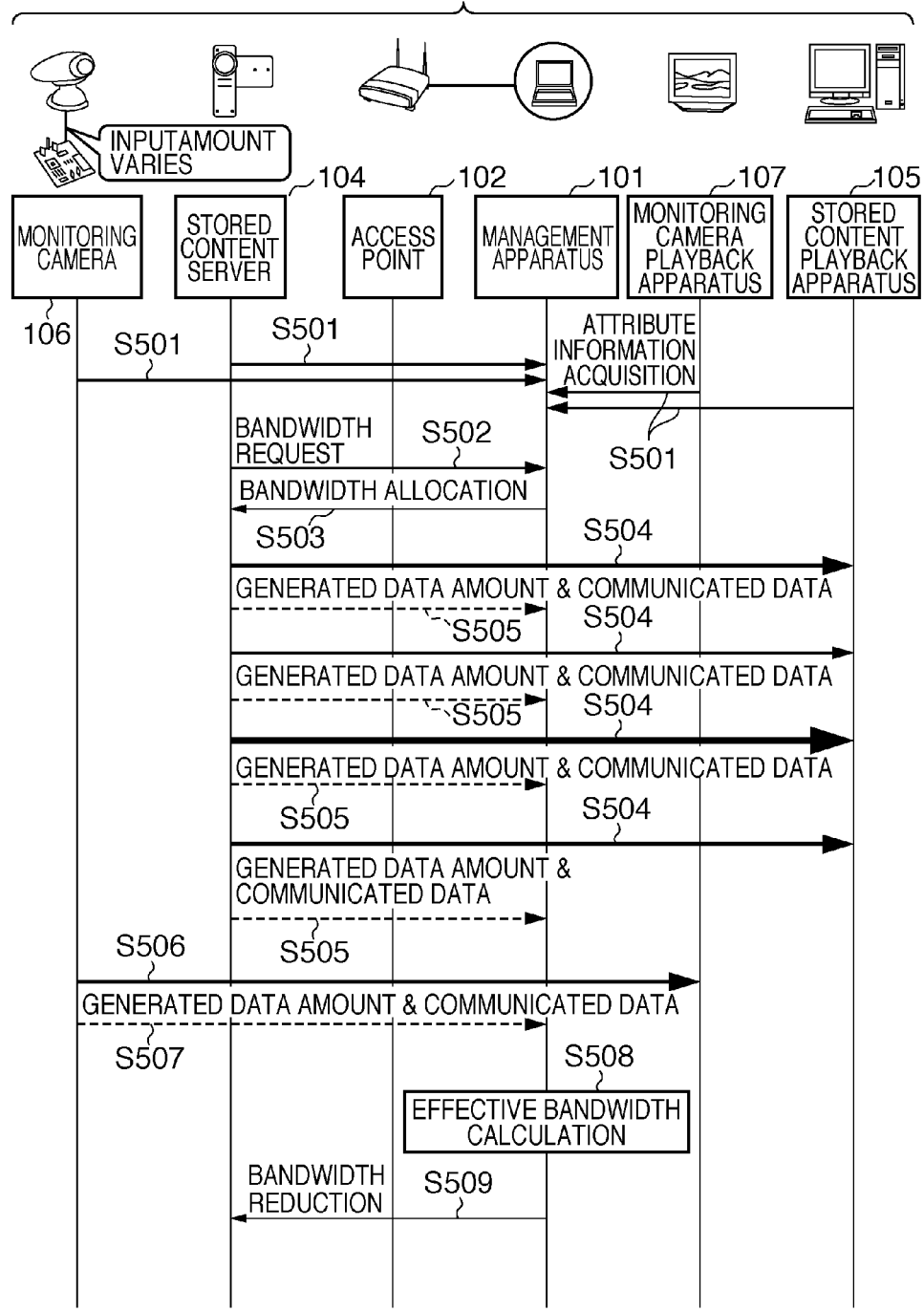
FIG. 5 is a sequence diagram showing the flow of operations of all constituent elements in the communication system.

Next, the processing flow between the management apparatus 101 and a single given terminal will be described using FIG. 5 to FIG. 8. FIG. 5 is a sequence diagram showing the flow of operations of all constituent elements in the communication system.

Firstly, in step S501, the management apparatus 101 obtains attribute information from each terminal. For example, the management apparatus 101 obtains attribute information indicating whether the communication terminal is a communication terminal that is able to control the generated data amount or a communication terminal that is unable to control the generated data amount. Next, at step S502, the terminal 104, which performs stored stream communication, requests the management apparatus 101 for bandwidth. At step S503, the management apparatus 101 returns a positive response to the bandwidth request to the terminal 104.

Subsequently, in step S504, the terminal 104, which made the bandwidth request, transmits data to the playback terminal 105, which is the destination. Then, in step S505, the terminal 104 notifies the generated data amount and the communication data amount to the management apparatus 101. The terminal 104 repeats the processing of steps S504 and S505 at fixed intervals. That is, the terminal 104 notifies communication state information every prescribed time interval.

In this state, the terminal 106, which is a monitoring camera, starts communication with the terminal 107 in step S506. At this time, the terminal 106 does not request the management apparatus 101 for bandwidth. However, in step S507, the terminal 106 (monitoring camera) notifies the generated data amount and the communication data amount to the management apparatus 101.

In step S508, the management apparatus 101 determines the state of the communication media, from the relation between the generated data amounts and the communication data amounts, and computes the effective bandwidth.

If the generated data amounts are greater than the effective bandwidth, the management apparatus 101, in step S509, performs processing such as reducing the bandwidth (bandwidth reduction process).

Figure 6:
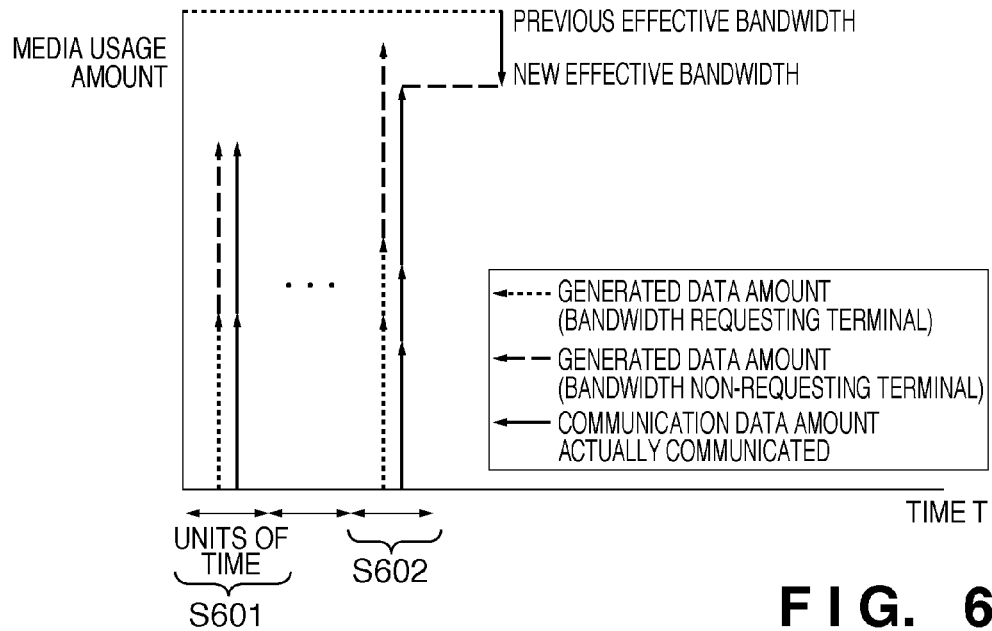
FIG. 6 is a diagram showing the relation between generated data amount, communication data amount and effective bandwidth.
Figure 7:
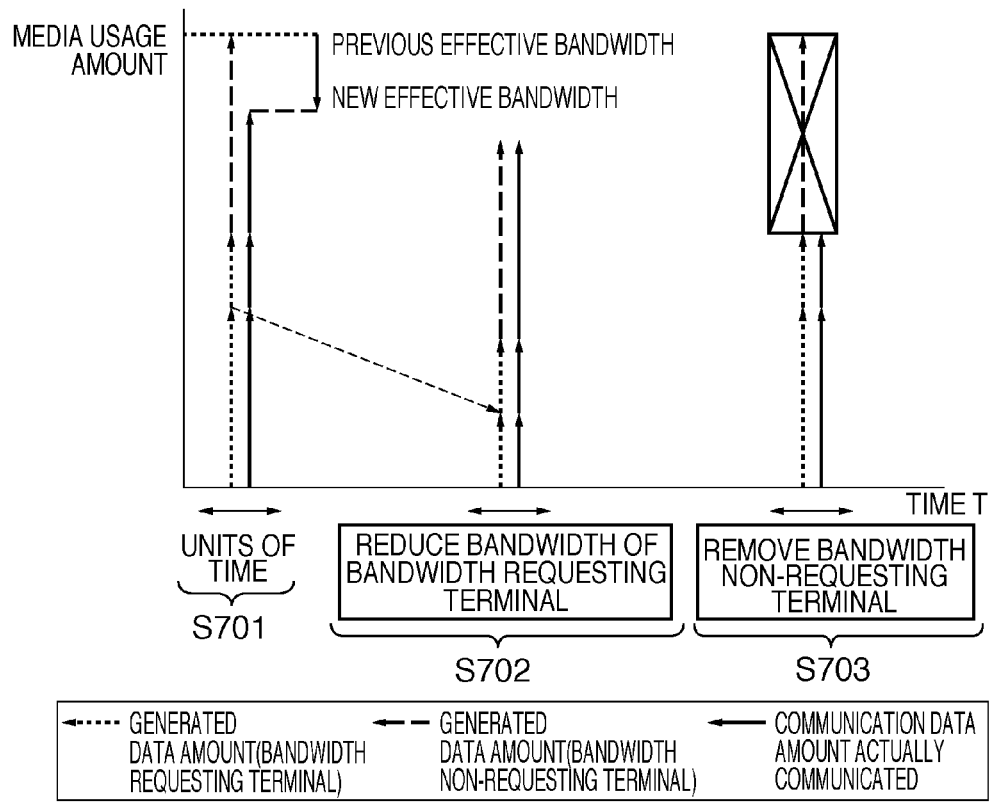
FIG. 7 is a diagram showing the relation between generated data amount, communication data amount and effective bandwidth.
Figure 8:
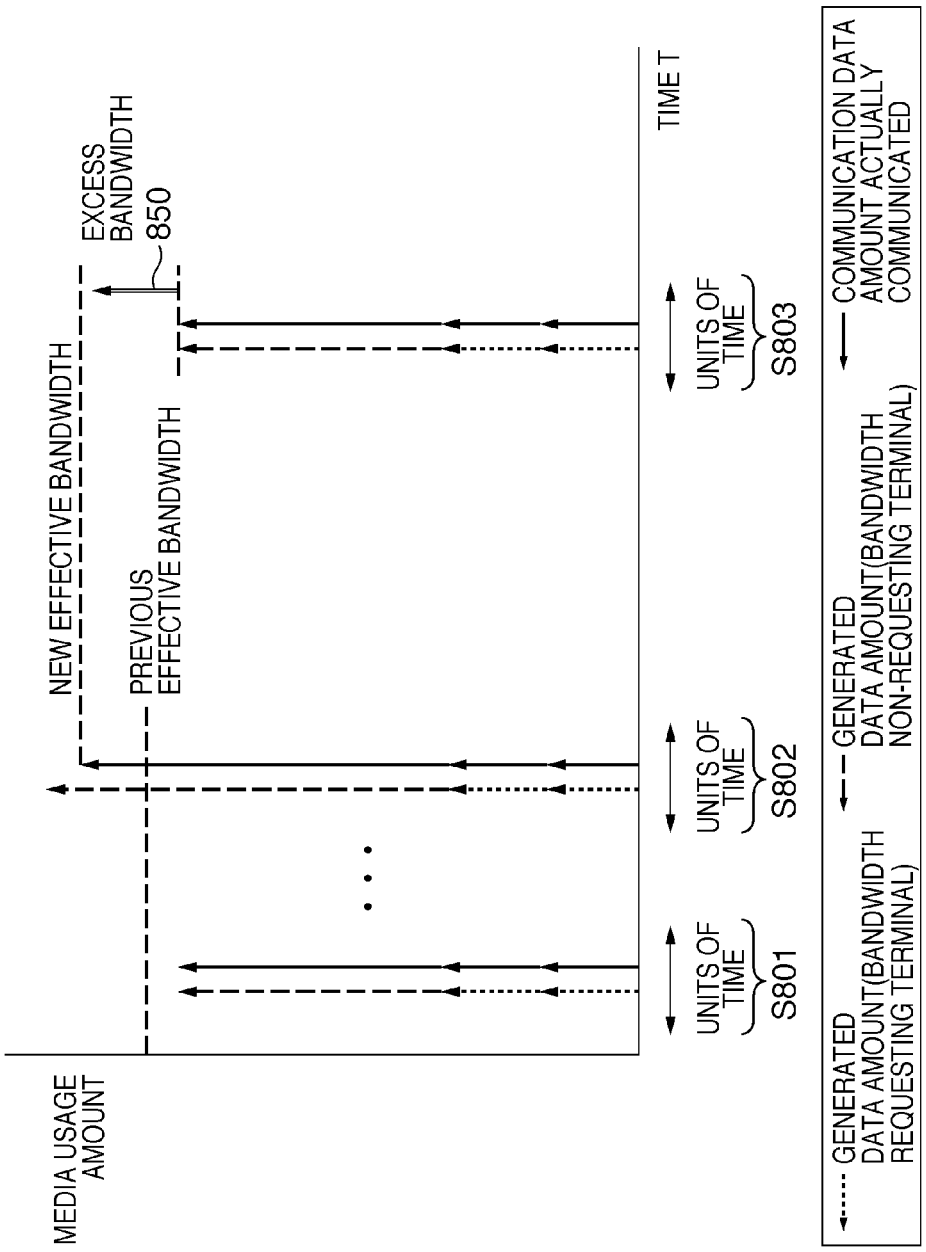
FIG. 8 is a diagram showing the relation between generated data amount, communication data amount and effective bandwidth.

FIG. 6 to FIG. 8 are diagrams showing the relation between generated data amount, communication data amount and effective bandwidth. Generated data amount, communication data amount and effective bandwidth are shown on the vertical axis and time is shown on the horizontal axis.

FIG. 6 shows processing up to and including the management apparatus 101 calculating the value of the effective bandwidth. The management apparatus 101 compares the respective sums of generated data shown by the dotted lines and communication data shown by the solid lines per unit of time. The management apparatus 101, in the case of the interval of step S601, judges that communication is being performed without interruption because the amounts of both generated data and communication data are the same.

Next, assume that, in the interval of step S602, the sum of communication data amounts is less than the generated data amounts. At this time, the management apparatus 101 views the value of the effective bandwidth as being the sum of communication data amounts.

FIG. 7 specifically shows control performed on terminals when the management apparatus 101 sets a new effective bandwidth. The case is shown where the effective bandwidth that the management apparatus 101 newly sets decreases compared with the previously set effective bandwidth.

Step S701 is the same state as step S602 in FIG. 6. In this state, the management apparatus 101 can respond in two ways.

Step S702 is a first way of responding, and involves the management apparatus 101 instructing a terminal that is able to control the generated data amount (bandwidth requesting terminal) to remove bandwidth (reduce the generated data amount). A terminal that receives this instruction responds by changing the CODEC settings, for instance. The generated data amounts and the communication data amounts are thereby brought into balance. From the viewpoint of stream communication, encoding speed falls, but playback can be performed in a state without delay or disruption.

Step S703 is a second way of responding, and involves the management apparatus 101 instructing a terminal that is unable to control the generated data amount (bandwidth non-requesting terminal) to remove itself from the system. A terminal that receives this instruction stops communication and disassociates from the access point to which it is connected.

FIG. 8 shows the case where the effective bandwidth increases compared with before.

Step S801 is the same state as step S601 in FIG. 6. Assume that, subsequently, in step S802, the sum of communication data amounts is greater than the effective bandwidth. At this time, the management apparatus 101 increases the effective bandwidth.

In the case of a state such as step S803, the management apparatus 101 views the amount shown by an arrow 850 as being excess bandwidth. Therefore, in the case where a given terminal newly makes a request for bandwidth equal to or less than the amount shown by the arrow 850, for example, the management apparatus 101 allows the request.

In the above description, notification of communication state information from a communication terminal is performed at a predetermined time interval, but the timing at which communication state information is notified is not limited to this. For example, a communication terminal may notify communication state information in response to an instruction from the management apparatus 101. Alternatively, the timing at which communication state information is notified may be determined by negotiation between the management apparatus 101 and the communication terminal. Note that negotiation can be performed at the timing of step S501 of the sequence in FIG. 5.

This enables the management apparatus 101 to collect communication state information only when necessary, and any increase in the communication data amount can be minimized.

Also, in the above description, the effective bandwidth is always calculated when communication state information is obtained, but the timings at which communication state information is collected and bandwidth is calculated need not be coordinated.

Further, in the case of not being coordinated, the effective bandwidth may be calculated on request from a communication terminal. The request from the communication terminal may be performed by the stream application or by a lower layer than the application layer. The conditions under which the stream application performs the request are a delay in data communication processing, a loss of communication data, and a value of a communication data error rate. The condition for a lower layer than the application layer performing the request is an amount of congestion in a communication queue (amount of communication data congestion). When these values reach a threshold value, the communication terminal requests the management apparatus 101 to calculate the effective bandwidth.

In this way, the following effects can be anticipated, as a result of the management apparatus 101 calculating the effective bandwidth only when requested to perform the effective bandwidth calculation by a communication terminal.

Control such as changing the bandwidth may not need to be performed as a result of an application in a communication terminal responding, even if control is necessary in terms of the communication bandwidth managed by the management apparatus 101. In such a case, the present embodiment enables the communication load due to instructions from the management apparatus 101 to the terminals to be reduced.

Other Embodiments

Aspects of the present invention can also be realized by a computer of a system or apparatus (or devices such as a CPU or MPU) that reads out and executes a program recorded on a memory apparatus to perform the functions of the above-described embodiment, and by a method, the steps of which are performed by a computer of a system or apparatus by, for example, reading out and executing a program recorded on a memory apparatus to perform the functions of the above-described embodiment. For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-006895, filed Jan. 15, 2009, which is hereby incorporated by reference herein in its entirety.

What is claimed is:

1. A communication control system comprising:
at least one communication terminal;
a management apparatus that manages the communication terminal; and
a wireless communication network in which the communication terminal and the management apparatus are communicable with each other,
wherein the communication terminal notifies, to the management apparatus, a generated data amount indicating a data amount that an application requests to be transmitted and a communication data amount indicating a data amount transmitted to the wireless communication network,
wherein the management apparatus includes a processor and a memory coupled to each other, the processor and the memory cooperating to function as:
a calculating unit adapted to calculate an effective bandwidth indicating a maximum value of the communication data amount usable in wireless communication by all communication terminals in the communication control system, based on the generated data amount and the communication data amount notified from the communication terminal;
an obtaining unit adapted to obtain attribute information indicating whether or not the communication terminal is able to control the generated data amount; and
a restricting unit adapted to restrict wireless communication by the communication terminal, based on the effective bandwidth calculated by the calculating unit and based on the attribute information obtained by the obtaining unit, and
wherein, in a case where a value of a new effective bandwidth calculated by the calculating unit decreases compared with a previously set effective bandwidth, the restricting unit selects a communication terminal that is able to control the generated data amount, based on the attribute information obtained by the obtaining unit, and instructs the selected communication terminal to reduce the generated data amount.

2. The communication control system according to claim 1,
wherein a timing at which the communication terminal notifies the generated data amount and the communication data amount to the management apparatus is when the communication terminal receives an instruction from the management apparatus, or is determined by negotiation between the management apparatus and the communication terminal.

3. The communication control system according to claim 1,
wherein the calculating unit calculates the effective bandwidth when notification of the generated data amount and the communication data amount is received.

4. The communication control system according to claim 1, wherein
the communication terminal further includes a requesting unit adapted to request the management apparatus to calculate the effective bandwidth, and
the requesting unit requests the management apparatus to calculate the effective bandwidth when at least one value of: a delay in data communication processing, a loss of communication data, a communication data error rate, and an amount of communication data congestion, reaches a threshold value.

5. A communication control method of a communication control system constituted by at least one communication terminal, a management apparatus that manages the communication terminal, and a wireless communication network in which the communication terminal and the management apparatus are communicable with each other, the communication control method comprising:
steps executed by the communication terminal including notifying, to the management apparatus, a generated data amount indicating a data amount that an application requests to be transmitted and a communication data amount indicating a data amount transmitted to the wireless communication network, and
steps executed by the management apparatus including:
calculating an effective bandwidth indicating a maximum value of the communication data amount usable in wireless communication by all communication terminals in the communication control system, based on the generated data amount and the communication data amount notified from the communication terminal;
obtaining attribute information indicating whether or not the communication terminal is able to control the generated data amount; and
restricting wireless communication by the communication terminal, based on the effective bandwidth calculated in the calculating step and based on the attribute information obtained in the obtaining step,
wherein, in a case where a value of a new effective bandwidth calculated in the calculating step decreases compared with a previously set effective bandwidth, the restricting step selects a communication terminal that is able to control the generated data amount, based on the attribute information obtained in the obtaining step, and instructs the selected communication terminal to reduce the generated data amount.

6. A non-transitory computer-readable recording medium storing a program that when executed causes a computer to perform the communication control method as claimed in claim 5.

7. A management apparatus that communicates with at least one communication terminal via a wireless communication network and manages the communication terminal, the management apparatus comprising:
a processor and memory coupled to each other, the processor and the memory cooperating to function as:
a receiving unit adapted to receive, from the communication terminal, a generated data amount indicating a data amount that an application requests to be transmitted and a communication data amount indicating a data amount transmitted to the wireless communication network;
a calculating unit adapted to calculate an effective bandwidth indicating a maximum value of the communication data amount usable in wireless communication by all communication terminals in the communication control system, based on the generated data amount and the communication data amount notified from the communication terminal;

an obtaining unit adapted to obtain attribute information indicating whether or not the communication terminal is able to control the generated data amount; and a restricting unit adapted to restrict wireless communication by the communication terminal, based on the effective bandwidth calculated by the calculating unit and based on the attribute information obtained by the obtaining unit, wherein, in a case where a value of a new effective bandwidth calculated by the calculating unit decreases compared with a previously set effective bandwidth, the restricting unit selects a communication terminal that is able to control the generated data amount, based on the attribute information obtained by the obtaining unit, and instructs the selected communication terminal to reduce the generated data amount.

* * * * *